Nov. 20, 1928.
J. B. STRAUSS
1,692,425
DEVICE FOR STOPPING HIGH POWERED VEHICLES
Filed Nov. 9, 1925    2 Sheets-Sheet 1
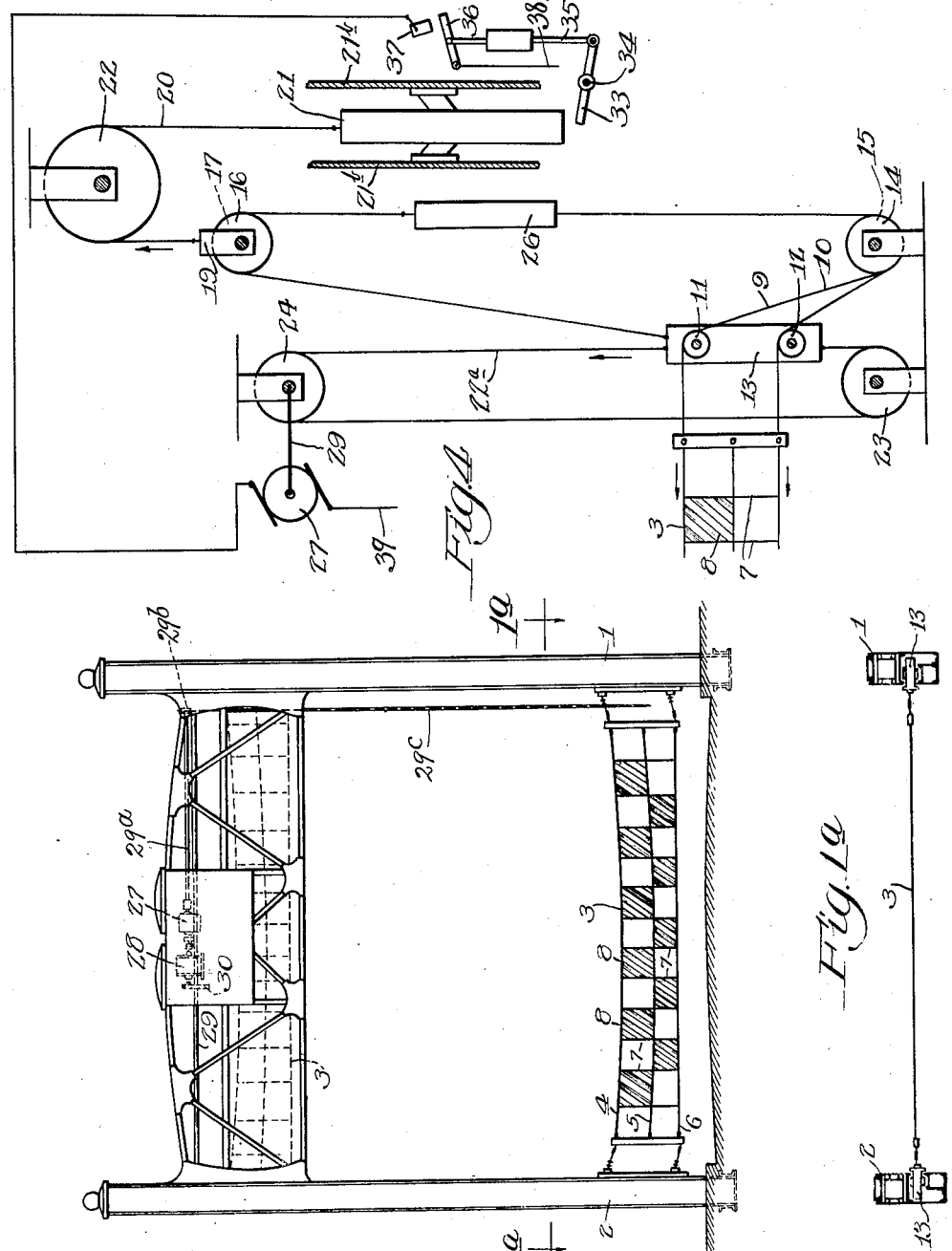

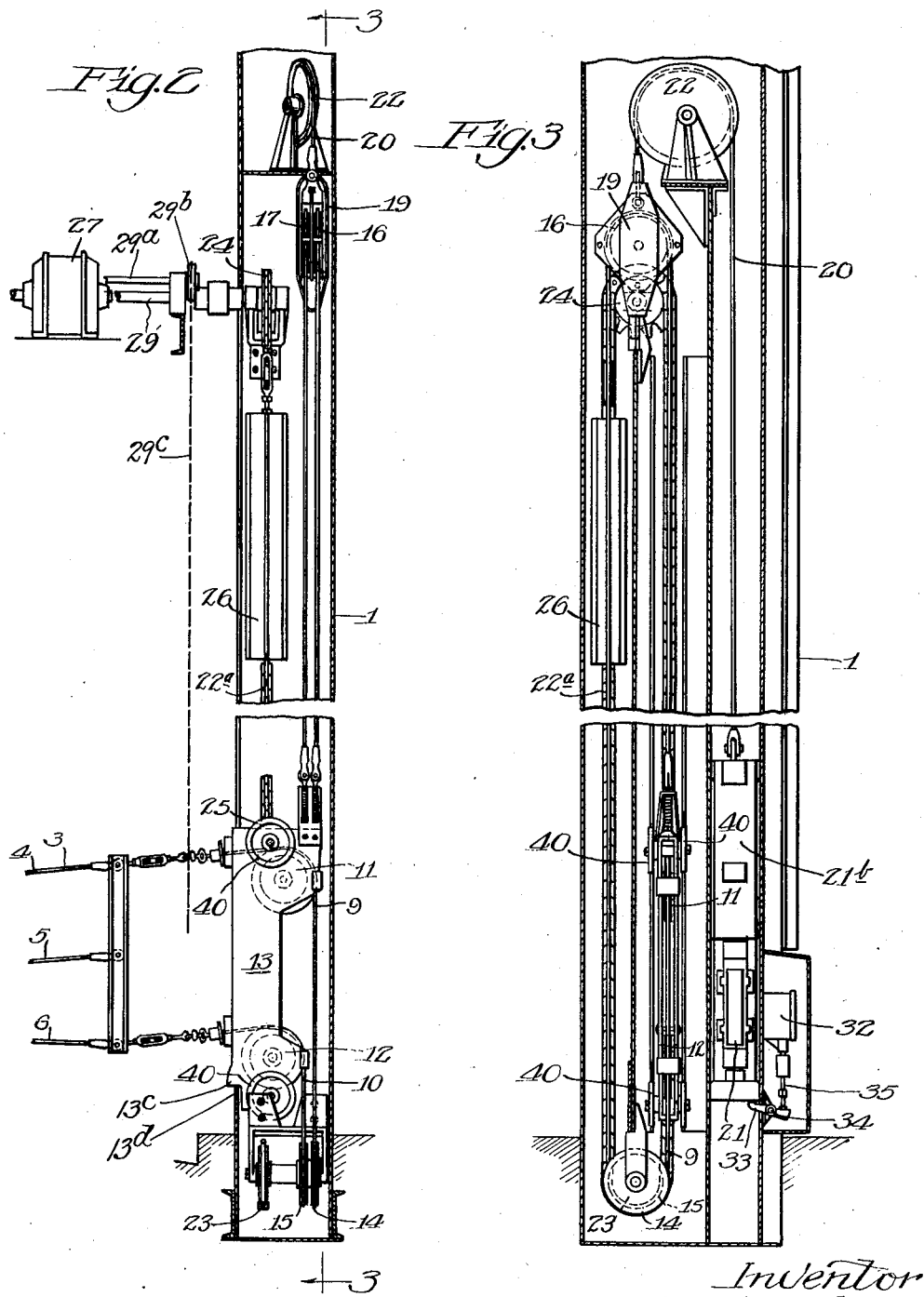

Patented Nov. 20, 1928.

1,692,425

UNITED STATES PATENT OFFICE.

JOSEPH B. STRAUSS, OF CHICAGO, ILLINOIS.

DEVICE FOR STOPPING HIGH-POWERED VEHICLES.

Application filed November 9, 1925. Serial No. 67,805.

This invention relates to devices for stopping high powered vehicles and has for its object to provide a new and improved device of this description.

The invention has as a further object to provide a device for stopping high powered vehicles which has a barrier portion extending across the roadway and which is adapted to pay out when struck by a vehicle, the barrier portion having means for lifting and lowering it and being provided with means for relieving the strain on the lifting and lowering mechanism when the device is struck by a vehicle.

The device is preferably arranged as an automatic barrier, and the invention has as a further object to prevent the barrier portion which extends across the roadway from being lifted after it has been struck by a vehicle and is in engagement with said vehicle.

The invention has as a further object to provide a strong, durable and highly efficient device for stopping high powered vehicles.

The invention has further objects which are more particularly pointed out in the accompanying description.

Referring now to the drawings:—

Fig. 1 is a view showing one form of device embodying the invention.

Fig. 1ᵃ is a sectional view taken on line 1ᵃ—1ᵃ of Fig. 1, with parts omitted.

Fig. 2 is an enlarged view showing the mechanism in one of the posts.

Fig. 3 is a view taken on line 3—3 of Fig. 2.

Fig. 4 is a diagrammatic view showing the operating chain, pay out members, and safety switch.

Referring now to the drawings wherein I have shown one form of device embodying the invention, there are provided two posts 1 and 2 at opposite sides of the roadway or other space to be protected. Extending across this roadway or space is a barrier portion 3 which is flexible and which is preferably made up of a network of cables. As herein shown, there are three cables 4, 5 and 6, and a series of connecting devices 7. The cables and connecting devices divide the barrier portion into spaces. In some of these spaces are provided danger indicators 8 for the purpose of directing the attention of drivers to the barrier portion when it is in its operative position.

Connected with the barrier portion are the pay out members 9 and 10. The mechanism in each of the posts is preferably similar and I have therefore described only the mechanism in one of the posts, it being understood that this mechanism is duplicated in the other post. These members pass over direction changing devices 11 and 12 connected with the spacers 13. The pay out members 9 and 10 pass downwardly about the direction changing devices 14 and 15, and then up over the pulleys or direction changing devices 16 and 17 and are then connected with the spacer 13, this connection being made through the elastic devices or springs 18. The pulleys or direction changing devices 16 and 17 are connected with or mounted upon a movable support 19. The support 19 is connected by means of a cable or other flexible connecting device 20 with a weight 21, the cable passing over the pulley or direction changing device 22. This weight 21 resists the initial movement of the barrier portion when struck by a vehicle and as it moves up it passes between braking members 21ᵇ which resist the movement of the weight and gradually stop the vehicle.

Means is provided for lifting and lowering the spacers and barrier section 3 so that it may be up out of the way when it is desired to let vehicles pass along the roadway, and is lowered when it is desired to prevent such vehicles from passing.

Any suitable raising and lowering mechanism may be used. As herein shown, the spacer 13 is provided with the flexible device 22ᵃ which is connected to the bottom of the spacer and then passes over the pulley or direction changing device 23 and then up over the pulley or direction changing device 24, and is then connected to the top of the spacer at 25. This flexible device preferably includes a weight 26 to counterbalance the weight of the spacer and associated parts. For convenience I have shown the flexible device 22ᵃ as a chain and the direction changing devices as sprocket wheels. Some means is provided for rotating the pulleys 24 so as to raise and lower the spacers and the barrier portion 3. In the construction shown a motor 27 is provided, said motor being provided with a speed reducing device 28 and being operatively connected to a shaft 29 with suitable gears 30, the shaft 29 being connected with the pulleys 24 so that when the motor is operated these pulleys will be rotated to raise or lower the spacers and barrier portion 3 of the device. Some means is provided for raising and lowering the barrier portion 3 by hand. In the construction shown the motor shaft 29ᵃ (see Figs. 1 and 2) is extended and is provided with a sprocket wheel 29ᵇ over which passes a chain 29ᶜ. By moving this chain the shaft 29ᵃ and shaft 29 will be rotated so as to raise and lower the barrier portion 3.

The spacers 13 are preferably provided with friction reducing means such as rollers 40 which engage the inner faces of the posts 1 and 2 as the spacers move up and down therealong. When the barrier portion 3 is down; that is, in its operative position, and is struck by a vehicle, it is moved forward and the pay out members 9 and 10 pay out so as to permit this forward movement. As these members pay out they pull down the supports 19 and this pulls up the weights 21 which retard the paying out of the pay out members and gradually stop the vehicle. It will be seen that since the ends of the pay out members are connected to the spacers, a balanced condition is produced when the barrier portion 3 is struck by a vehicle, for the downward pull on the spacers, due to the pay out members running down and over the pulleys 14 and 15, is balanced by the upward pull of the pay out members attached to the upper ends of the spacers; and hence there is no strain or pull placed upon the chains 22ᵃ when the barrier is struck by a vehicle. In other words, it will be seen that by this construction the stresses produced by a vehicle striking the barrier portion 3 are properly taken care of and are balanced so far as the lifting chains 22ᵃ are concerned.

When a vehicle strikes the barrier portion 3 and pushes it out, it is desirable to have means for preventing the spacers and barrier portion 3 from being lifted while the vehicle is in contact with the barrier portion. I have illustrated one means for this purpose which consists in arranging a device for breaking the circuit through the motor 27 when the vehicle is in engagement with the barrier portion 3. The particular construction illustrated in the drawings consists of a switch actuated by the weight 21, this switch being located in the motor circuit. In Figs. 3 and 4 the switch 32 is held closed by the weight 21 when it is in the position it occupies when the barrier portion 3 extends straight across the roadway and no vehicle is in contact with it. When the weight is in this position it engages a lever 33 pivoted at 34, this lever being connected with a member 35, which in turn is connected with the movable member 36 of the switch and which holds this movable member into contact with the contacts 37 of the switch. When the barrier portion 3 is struck by a vehicle so as to be pushed out, the weight 21 is lifted and the member 35 drops down either by its own weight or by the assistance of the retracting device 38 herein shown as a weight. This moves the switch member 36 out of contact with the contact 37 and opens the circuit through the motor. While the parts are in this position it will be impossible to start the motor so as to lift the barrier portion 3. When the barrier portion 3 is released by the vehicle the parts move back to their initial position and the weight engages the lever 33 and moves the switch member 36 into contact with the contact 37 thereby closing the circuit through the motor. The motor can now be started and the barrier portion 3 and the spacers lifted so as to be out of the way.

Means for preventing the barrier portion from being lifted when the vehicle is in contact with it is of importance under all conditions, but is particularly important when the barrier portion is automatically raised and lowered by a train or car. Under such circumstances if the barrier portion should be struck by a vehicle while the train is approaching it will prevent the vehicle from getting into the path of the train or car and therefore from being struck thereby. As the train or car passes it closes the switch to automatically actuate the motor, and if there is no safety device as herein illustrated, the vehicle in engagement with the barrier portion 3 will either be lifted or the mechanism injured or broken by the weight of said vehicle.

The motor may be connected to any source of electric supply by means of the conductors 38 and 39. This connection is preferably made through a controlling switch so that the motor is controlled by a passing car, as illustrated, for example, in my application Serial Number 634,478, filed April 25, 1923.

I may provide stops for the direction changing devices 11 and 12 for limiting the downward movement thereof when in their lowered position. This may be done, for example, by providing the stops 13ᵈ which engage the parts to which the direction changing devices are connected, in this instance the spacers 13. These spacers are provided with projections 13ᶜ, in the construction illustrated, which engage the stops 13ᵈ. It will be seen that since the pay out members pass downwardly from the direction changing devices 11 and 12 and then over the direction changing devices 14 and 15 and are then connected with a resisting device, the pull on the direction changing devices 11 and 12 when the barrier portion is struck by a vehicle, will be downward and that therefore this construction takes the pull and relieves the raising and lowered mechanism from any strain due to the striking of the barrier portion.

The use and operation of my invention are as follows:—

When there is no danger to passing vehicles on the roadway, the barrier portion 3 is up out of the way so as to leave a free passage beneath it. When it is desired to prevent the passage of vehicles along the roadway, the motor is set in operation and the barrier portion 3 lowered to its operative position as shown in Fig. 1. If now, a vehicle strikes the barrier portion 3, the barrier portion is moved along the roadway, the pay out members 9 and 10 permitting this movement.

The paying out of these members lowers the supports 19 and causes the weights 21 to be lifted to be acted upon by the brake members, thereby gradually stopping the vehicle. The fact that the pay out members run downwardly under the pulleys 14 and 15 and then upwardly over the pulleys 16 and 17 and then downwardly and connect with the spacers, produces a balanced condition when the barrier portion 3 is struck and relieves the chains 22ª from any stresses due thereto. The upward movement of the weight 21 causes the switch member 36 to move to open the circuit through the motor 28. The barrier portion 3 cannot then be lifted. When the barrier portion 3 is returned to its normal position, the vehicle being released therefrom, the weight 21 moves to its initial position and closes the switch. The circuit can then be completed through the motor 28, and the barrier portion 3 raised to its inoperative position so as to be out of the way.

I claim:—

1. A device for stopping vehicles comprising separated posts, a barrier portion extending between said posts, flexible pay out members connected with said barrier portion, direction changing devices over which said pay out members pass, a spacer to which said direction changing devices are connected, direction changing devices connected with said posts over which the pay out members pass and located below the first-mentioned direction changing devices, direction changing devices above the spacer over which said pay out members pass, said pay out members passing downwardly from said latter direction changing devices and being connected with said spacer, and a raising and lowering mechanism for said spacer.

2. A device for stopping vehicles comprising posts on opposite sides of the roadway, a flexible barrier portion extending between said posts, a pay out member connected with each end of said flexible barrier portion, a direction changing device slidably mounted on each post over which said pay out members pass, a raising and lowering mechanism for said direction changing device, and means for balancing the stresses on the direction changing device due to a vehicle striking the barrier portion so as to relieve the raising and lowering mechanism of said stresses.

3. A device for stopping vehicles comprising separated posts, a barrier portion extending between said posts, flexible pay out members connected with said barrier portion, direction changing devices over which said pay out members pass, a spacer to which said direction changing devices are connected, direction changing devices connected with said posts over which the pay out members pass and located below the first-mentioned direction changing devices, direction changing devices above the spacer over which said pay out members pass, said pay out members passing downwardly from said latter direction changing devices and being connected with said spacer, resisting means with which said latter direction changing devices are connected and which resist the paying out of said flexible pay out members, and a raising and lowering mechanism for said spacer.

4. A device for stopping vehicles comprising separated posts, a barrier portion extending between said posts, flexible pay out members connected with each end of said barrier portion, spacers which said pay out members movably engage, resisting means connected with said pay out members which resist the movement of the barrier portion when it is struck by a vehicle, raising and lowering mechanism for said spacers, and means for balancing the stresses on said raising and lowering mechanism when the barrier portion is struck by a vehicle.

5. A device for stopping vehicles comprising separated posts, a barrier portion extending between said posts, flexible pay out members connected with each end of said barrier portion, spacers which said pay out members movably engage, resisting means connected with said pay out members which resist the movement of the barrier portion when it is struck by a vehicle, raising and lowering mechanism for said spacers, direction changing devices above and below said spacers engaged by said pay out members, the ends of the pay out members being connected with said spacers whereby the stresses on the raising and lowering mechanism when the barrier portion is struck by a vehicle, are equalized.

6. A device for stopping vehicles comprising separated posts, a barrier portion extending between said posts, flexible pay out members connected with each end of said barrier portion, spacers which said pay out members movably engage, resisting means connected with said pay out members which resist the movement of the barrier portion when it is struck by a vehicle, raising and lowering mechanism for said spacers, and means for balancing the stresses on said raising and lowering mechanism when the barrier portion is struck by a vehicle, through the agency of said pay out members.

7. A device for stopping vehicles comprising separated posts, a barrier portion extending between said posts, flexible pay out members connected with each end of said barrier portion, spacers slidably mounted on said posts, direction changing devices on said spacers over which the pay out members pass, direction changing devices below said spacers and fastened in position over which said pay out members pass, direction changing devices above said spacers over which said pay out members pass, said pay out members extending downwardly and being connected with said spacers, supports with which said latter direction changing devices are connected, flexible connecting members connected with said supports, direction changing devices over which they pass, and weights connected with said flexible connecting members.

8. A device for stopping vehicles comprising separated posts, a barrier portion extending between said posts, flexible pay out members connected with each end of said barrier portion, spacers slidably mounted on said posts, a looped chain connected with the top and bottom of each spacer, sprocket wheels over which said chain passes, a driving device for one of said sprocket wheels for rotating it so as to raise and lower said spacer, means for removing the stresses on said chain when the barrier portion is struck, comprising direction changing devices on said spacers over which the pay out members pass, direction changing devices below said spacers and fastened in position over which said pay out members pass, direction changing devices above said spacers over which said pay out members pass, said pay out members extending downwardly and being connected with said spacers, supports with which said latter direction changing devices are connected, flexible connecting members connected with said supports, direction changing devices over which they pass, and weights connected with said flexible connecting members.

9. A device for stopping vehicles comprising separated posts, a barrier portion extending between said posts, flexible pay out members connected with said barrier portion, direction changing devices over which they pass, said direction changing devices connected with said posts so that they may be moved up and down therealong, a motor for moving said direction changing devices along said posts, a resisting device connected with said pay out members and adapted to resist the paying out thereof when the barrier portion is struck by a vehicle, and means associated with said resisting devices for rendering said motor inoperative when the pay out members are partially paid out.

10. A device for stopping vehicles comprising separated posts, a barrier portion extending between said posts, flexible pay out members connected with said barrier portion, direction changing devices over which they pass, means for raising and lowering said direction changing devices, a stop for limiting the downward movement of said direction changing devices when in their lowered position, additional direction changing devices below said first-mentioned direction changing devices over which said pay out members pass, and a resisting device connected with said pay out members and adapted to resist the paying out thereof when the barrier portion is struck by a vehicle.

11. A device for stopping vehicles comprising a barrier portion extending across the space to be protected, a flexible pay out member connected with said barrier portion, a direction changing device over which said pay out member passes, a support upon which the direction changing device is mounted, a raising and lowering mechanism for said support, a resisting device with which said pay out member is connected which resists the paying out of said pay out member when the barrier portion is struck by a vehicle, a stop which engages the support of said direction changing device when the barrier portion is in its lowermost position and is struck by a vehicle so as to prevent the movement of said direction changing device under the impact of said vehicle.

12. A device for stopping vehicles comprising a barrier portion extending across the space to be protected, means for raising and lowering said barrier portion, means for causing the pressure exerted on the barrier portion by a vehicle striking it, to be exerted in a downward direction and a stop for resisting said downward pressure.

Signed at Chicago, county of Cook, and State of Illinois, this 30th day of October, 1925.

JOSEPH B. STRAUSS.